United States Patent
Kuo (10) Patent No.: US 7,254,144 B2
(45) Date of Patent: Aug. 7, 2007

(54) METHOD FOR SYNCHRONIZING A START VALUE FOR SECURITY IN A WIRELESS COMMUNICATIONS NETWORK

(75) Inventor: Lee-Chee Kuo, Hsin-Chu (TW)

(73) Assignee: Innovative Sonic Limited, Tortola (VG)

(*) Notice: Subject to any disclaimer, the term of this patent is extended or adjusted under 35 U.S.C. 154(b) by 1134 days.

(21) Appl. No.: 10/064,204

(22) Filed: Jun. 21, 2002

(65) Prior Publication Data

US 2003/0235212 A1    Dec. 25, 2003

(51) Int. Cl.
*H04J 3/06* (2006.01)
(52) U.S. Cl. .................. 370/503; 370/331; 455/436
(58) Field of Classification Search ................ 370/503, 370/331–334; 455/436–444
See application file for complete search history.

(56) References Cited

U.S. PATENT DOCUMENTS

| | | | |
|---|---|---|---|
| 6,925,298 B2 * | 8/2005 | Ho ............................ | 455/411 |
| 2003/0235231 A1 * | 12/2003 | Rincon et al. ................ | 373/60 |
| 2003/0236085 A1 * | 12/2003 | Ho ............................ | 455/411 |

OTHER PUBLICATIONS

3GPP TS 25.331 V3.10.0 (Mar. 2002) 3rd Generation Partnership Project; Technical Specification Group Radio Access Network; Radio Resource Control (PRC); Protocol Specification (Release 1999).

3GPP TS 25.322 V3.10.0 (Mar. 2002) 3rd Generation Partnership Project; Technical Specification Group Radio Access Network; Radio Link Control (RLC) protocol specification (Release 1999).

* cited by examiner

*Primary Examiner*—Doris H. To
*Assistant Examiner*—Habte Mered
(74) *Attorney, Agent, or Firm*—Birch, Stewart, Kolasch & Birch, LLP (57) ABSTRACT

A UTRAN sends a Radio Bearer Setup message to a UE, which indicates that SRNS relocation is to be performed and that a new RB is to be established in a first domain. The UE receives the Radio Bearer Setup message and assigns a first START value to a START_VALUE_TO_TRANSMIT variable according to the HFNs of all established RBs in the first domain. The UE the generates a START list containing entries corresponding all domains, including the first domain. The UE fills the entries with corresponding START values, synchronizing the entry corresponding to the first domain to hold a value that is identical to the value of the START_VALUE_TO_TRANMIT variable. The UE then composes a reply message that includes the START list, and sends the reply message to the UTRAN. The UE utilizes the START_VALUE_TO_TRANSMIT variable to set an HFN of the new RB. In a second embodiment, the response message includes both the START list and the START_VALUE_TO_TRANMIT variable. The START list is applied to all RBs but the new RB. The START_VALUE_TO_TRANMIT variable is applied to the new RB.

6 Claims, 9 Drawing Sheets

METHOD FOR SYNCHRONIZING A START VALUE FOR SECURITY IN A WIRELESS COMMUNICATIONS NETWORK

BACKGROUND OF INVENTION

1. Field of the Invention

The present invention relates to a wireless communications network. In particular, the present invention discloses a method for synchronizing a START value between two entities in a 3GPP wireless system.

2. Description of the Prior Art

Figure 1:
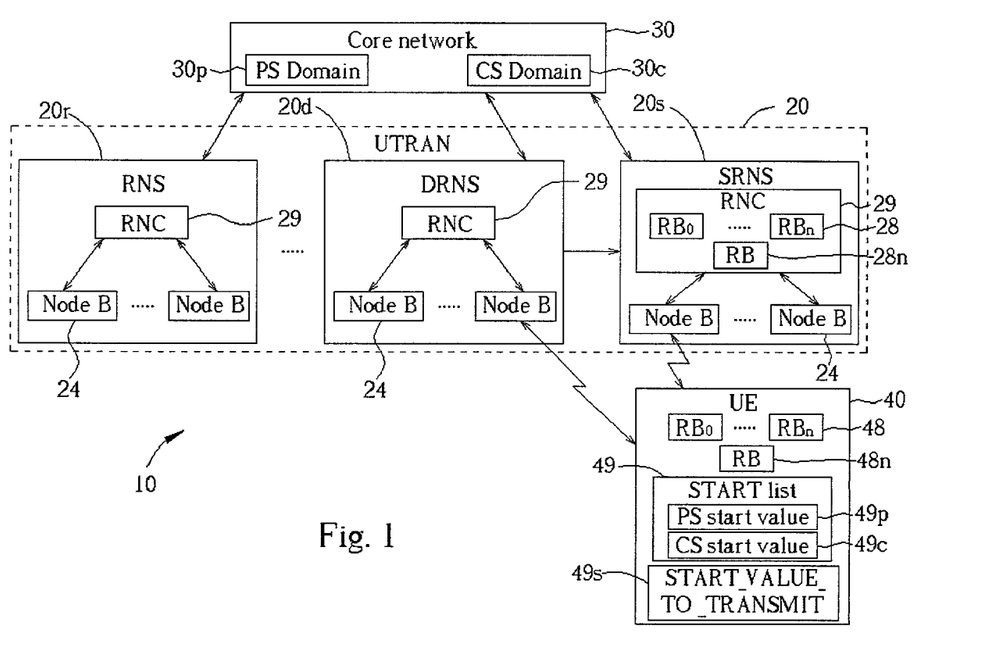
FIG. 1 is a simple block diagram of a wireless communications system.

Please refer to FIG. 1. FIG. 1 is a simple block diagram of a wireless communications network 10, as defined by the $3^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference. The wireless communications network 10 comprises a plurality of radio network subsystems (RNSs) 20r in communications with a core network (CN) 30. The plurality of RNSs 20r is termed a Universal Mobile Telecommunications System (UMTS) Terrestrial Radio Access Network, or UTRAN 20 for short. Each RNS 20r comprises one radio network controller (RNC) 29 that is in communications with a plurality of Node Bs 24. Each Node B 24 is a transceiver, which is adapted to send and receive wireless signals, and which defines a cell region. A plurality of Node Bs 24 defines a UTRAN Registration Area (URA). In particular, the wireless communications network 10 assigns a mobile unit 40 (generally termed a "UE" for User Equipment) to a particular RNS 20r, which is then termed the serving RNS (SRNS) 20s of the UE 40. Data destined for the UE 40 is sent by the CN 30 (or UTRAN 20) to the SRNS 20s. It is convenient to think of this data as being sent in the form of one or more packets that have a specific data structure, and which travel along one of a plurality of radio bearers (RBs) 28, 48. An RB 28 established on the SRNS 20s will have a corresponding RB 48 established on the UE 40. The RBs are numbered consecutively, from RB0 to RBn. Typically, RB0 to RB4 are dedicated signaling RBs (SRBs), which are used for passing protocol signals between the UTRAN 20 and the UE 40, and will be described in some more detail below. RBs 28, 48 greater than four (i.e., RB5, RB6, etc.) are typically used to carry user data, but may also be SRBs. The RNC 29 utilizes a Node B 24, which is assigned to the UE 40 by way of a Cell Update procedure, to transmit data to, and receive data from, the UE 40. The Cell Update procedure is initiated by the UE 40 to change a cell as defined by a Node B 24, and even to change a URA. Selection of a new cell region will depend, for example, upon the location of the UE 40 within the domain of the SRNS 20s. The UE 40 broadcasts data to the wireless communications network 10, which is then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 29 of the DRNS 20d forwards the received signal to the SRNS 20s. The SRNS 20s uses this forwarded signal from the DRNS 20d, plus the corresponding signals from its own Node Bs 24 to generate a combined signal that is then decoded and finally processed into packet data. The SRNS 20s then forwards the received data to the CN 30. Consequently, all communications between the UE 40 and the CN 30 must pass through the SRNS 20s.

Figure 2:
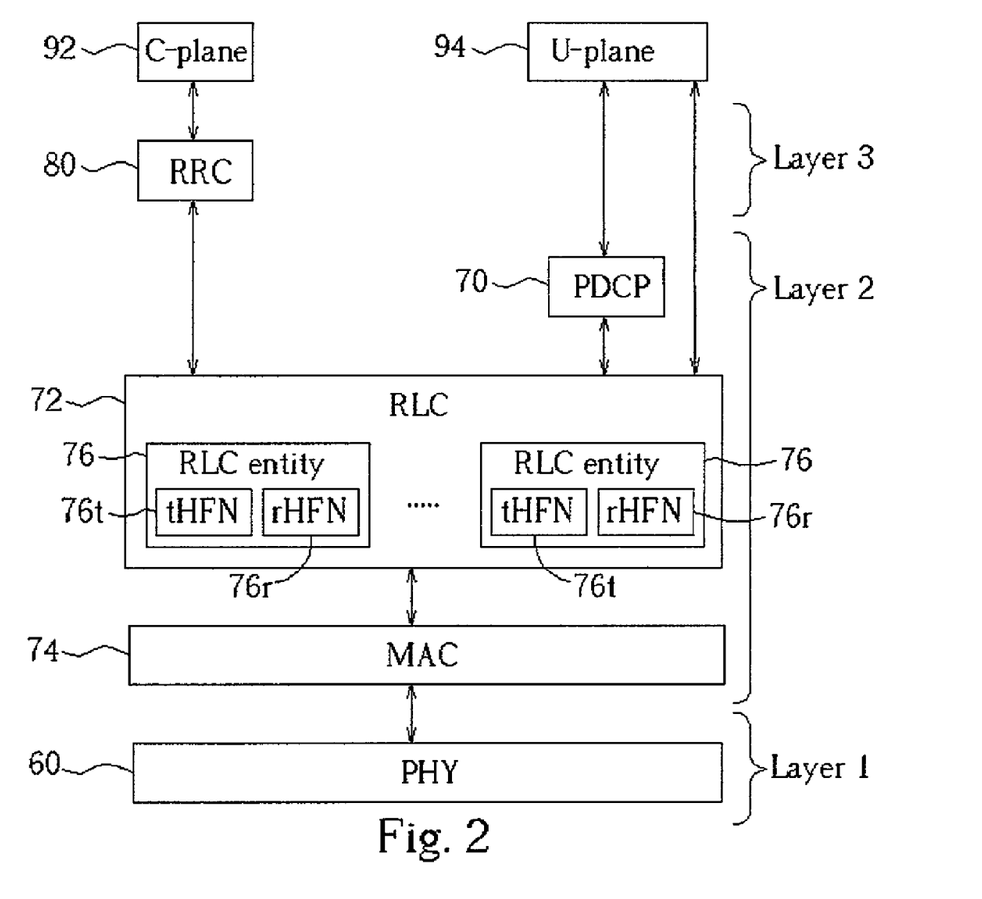
FIG. 2 is a simple block diagram of a UMTS radio interface protocol architecture.

Please refer to FIG. 2 in conjunction with FIG. 1. FIG. 2 is a simple block diagram of a UMTS radio interface protocol architecture, as used by the communications network 10. Communications between the UE 40 and the UTRAN 20 is effected through a multi-layered communications protocol that includes a layer 1, a layer 2 and a layer 3, which together provide transport for a signaling plane (C-plane) 92 and a user plane (U-plane) 94. Layer 1 is the physical layer 60, responsible for the actual transmitting and receiving of wireless signals, and in the UTRAN 20 is responsible for combining signals received from the DRNS 20d and SRNS 20s. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20, whereas the C-plane 92 handles transport for signaling data between the UE 40 and the UTRAN 20. The RRC 80 sets up and configures all RBs 28, 48 between the UTRAN 20 and the UE 40. The PDCP layer 70 provides header compression for Service Data Units (SDUs) received from the U-plane 94. The RLC layer 72 provides segmentation of PDCP 70 SDUs, RRC 80 SDUs and U-plane 94 SDUs into RLC protocol data units (PDUs), and under acknowledged mode (AM) transfers, can provide upper layers (such as the PDCP layer 70 or the RRC layer 80) with a confirmation that RLC PDUs have been successfully transmitted and received between the UTRAN 20 and the UE 40. The MAC layer 74 provides scheduling and multiplexing of RLC PDUs onto the transport channel, interfacing with the physical layer 60.

Figure 3:
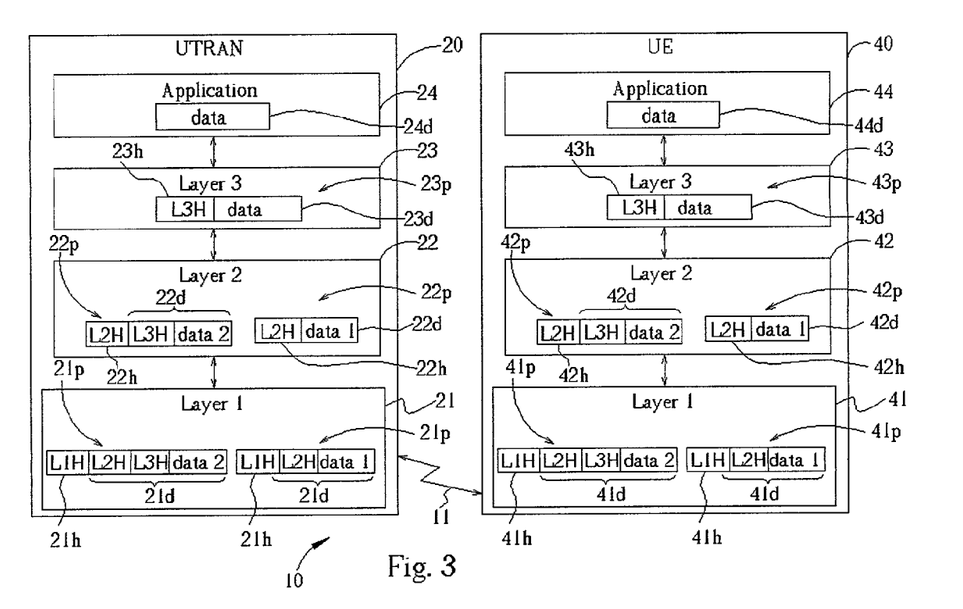
FIG. 3 is a simplified block diagram of example communications between a UTRAN and a UE shown in FIG. 1.

Before proceeding, it is worth taking note of terminology used in the following. An SDU is any packet that is received from an upper layer or passed to an upper layer, whereas a PDU is a packet generated by a layer and passed on to a lower layer or received from a lower layer. Hence, a PDCP PDU is an RLC SDU. Similarly, an RLC PDU is a MAC SDU, and so forth. Generally, a PDU is formed by adding a header to SDU data received from an upper layer, or by internally generating a packet for layer-to-layer communications between the UE 40 and the UTRAN 20. Please refer to FIG. 3 with reference to FIG. 1 and FIG. 2. FIG. 3 is a simplified block diagram of example communications between the UTRAN 20 and the UE 40. An application 24 in the C-plane 92 on the UTRAN 20 needs to send data 24d to an application 44 on the UE 40. The application 24 connects with a layer 3 interface 23 (i.e., the RRC 80), and passes the data 24d to the layer 3 interface 23. The layer 3 interface 23 uses the data 24d to form a layer 3 protocol data unit (PDU) 23p. The layer 3 PDU 23p includes a layer 3 header 23h and data 23d, which is identical to the data 24d. The layer 3 header 23h the layer 3 PDU 23p contains information needed by the peer layer 3 interface 33 on the UE 40 (i.e., the peer RRC layer 80) to effect proper communications. The layer 3 interface 23 then passes the layer 3 PDU 23p to the layer 2 interface 22. The layer 2 interface 22 (which includes the RLC layer 72, the PDCP layer 70 and the MAC layer 74) uses the layer 3 PDU 23p to build one or more layer 2 PDUs 22p. Generally speaking, each layer 2 PDU 22p has the same fixed size, which is determined by the MAC layer 74. Consequently, if the layer 3 PDU 23p is quite large, the layer 3 PDU 23p will be segmented by the layer 2 interface 22 to form several layer 2 PDUs 22p, as is shown in FIG. 3. Each layer 2 PDU 22p contains a data region 22d, and a layer 2 header 22h. In FIG. 3, the data 23d has been broken into two layer 2 PDUs 22p. Also note that the layer 3 header 23h is placed in the data region 22d of a layer 2 PDU 22p. The layer 3 header 23h holds no significance for the layer 2 interface 22, and is simply treated as data. The layer 2 interface 22 then passes the layer 2 PDUs 22p to the layer 1 interface 21. The layer 1 interface 21 accepts the layer 2 PDUs 22p and uses them to build layer 1 PDUs 21p. As with the preceding layers, each layer 1 PDU 21p has a data region 21d and a layer 1 header 21h. Note that the layer 3 header 23h and layer 2 headers 22h are no more important to the layer 1 interface 21 than the application data 24d. The layer 1 interface 21 then transmits the layer 1 PDUs 21p to the UE 40.

A reverse process occurs on the UE 40. After receiving layer 1 PDUs 41p from the UTRAN 20, the layer 1 interface 31 on the UE 40 removes the layer 1 headers 41h from each received layer 1 PDU 41p. This leaves only the layer 1 data regions 41d, which are, in effect, layer 2 PDUs. These layer 1 data regions 41d are passed up to the layer 2 interface 42. The layer 2 interface 42 accepts the layer 2 PDUs 42p and uses the layer 2 headers 42h to determine how to assemble the layer 2 PDUs 42p into appropriate layer 3 PDUs. In the example depicted in FIG. 3, the layer 2 headers 42h are stripped from the layer 2 PDUs 42p, leaving only the data regions 42d. The data regions 42d are appended to each other in the proper order, and then passed up to the layer 3 interface 43. The layer 3 interface 43 accepts the layer 3 PDU 43p from the layer 2 interface 42, strips the header 43h from the layer 3 PDU 43p, and passes the data region 43d to the application 44. The application 44 thus has data 44d that should be identical to the data 24d sent by the application 24 on the UTRAN 20. Note that each layer in the communications stack can also generate packets exclusively for inter-layer signaling between the UTRAN 20 and the UE 40. Hence, a frequent occurrence is the UTRAN 20 RRC layer 80 generating a signaling packet for the UE 40 RRC layer 80, and vice versa, which would be a RRC PDU. These RRC signaling PDUs, however, are never passed up to the application layers 24, 44 as SDU data. An example of such an RRC signaling packet is a request for a ciphering reconfiguration activation, which includes a Security Mode Command on downlink (UTRAN 20 to UE 40) and a Security Mode Complete on uplink (UE 40 to UTRAN 20), and reconfiguration messages to establish and reconfigure RBs 48, 28.

Figure 4:
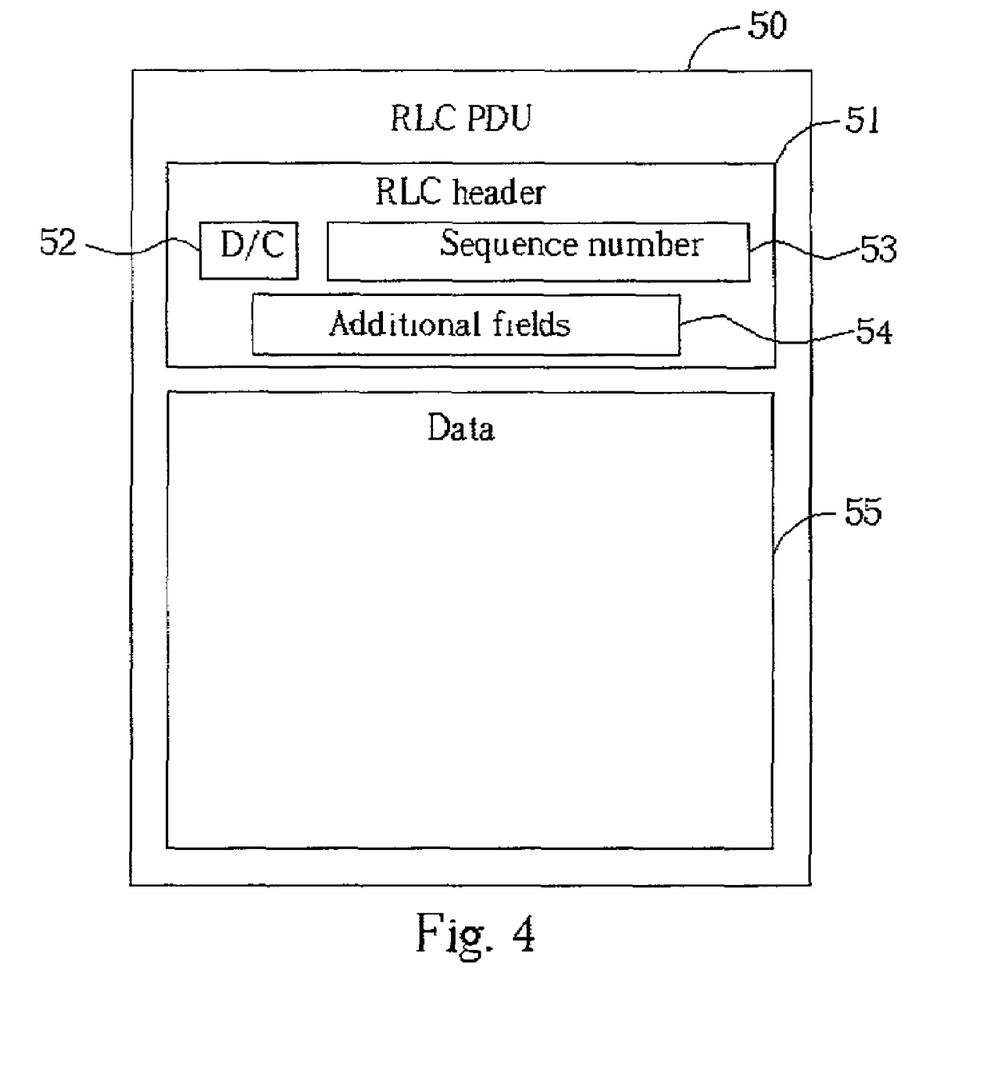
FIG. 4 is simplified block diagram of an RLC layer PDU.

Of particular relevance to the present invention is the RLC layer 72 in the layer 2 stack. The RLC layer 72 generates RLC PDUs of a fixed size that is determined by the MAC layer 74, and sends these RLC PDUs to the MAC layer 74 for transmission, or receives RLC PDUs from the MAC layer 74. Each RLC PDU explicitly carries an n-bit sequence number in its header that identifies the sequential position of that RLC PDU in a stream of RLC PDUs, and which thus enables RLC PDUs to be assembled in their proper order to form RLC SDUs (i.e., PDCP PDUs, or RRC PDUs). Please refer to FIG. 4 in conjunction with FIGS. 1 to 3. FIG. 4 is simplified block diagram of an RLC layer PDU 50. The RLC PDU 50 has an RLC header 51 and a data region 55. As noted above, the data region 55 is used to carry layer 3 PDUs 23p received from the layer 3 interface 23, or to carry data received from the PDCP layer 70. The RLC header 51 includes a data/control indicator bit 52, a sequence number field 53, and additional fields 54. The additional fields 54 are not of direct relevance to the present invention, and so will not be discussed. The data/control bit 52 is used to indicate if the RLC PDU 50 is a data PDU or a control PDU. Data PDUs are used to carry layer upper layer data. Control PDUs are generated internally by the RLC layer 72 and are used exclusively for signaling between RLC peer entities 72. Control PDUs are thus never passed up to the RRC layer 80 or the PDCP layer 70. The sequence number field 53 contains the n-bit value that is used to reassemble the RLC PDUs 50 into upper layer PDUs. Each RLC PDU 50 is transmitted with a successively higher value in the sequence number field 53, and in this manner the RLC layer 72 knows the correct ordering of received RLC PDUs 50.

The RLC layer 72 is composed of one or more RLC entities 76. Each RLC entity 76 is individually associated with an RB 28, 48. For an RB 28 on the UTRAN 20 side, there exists an RLC entity 76 dedicated solely to that RB 28. For the same RB 48 on the UE 40 side, there similarly exists a corresponding RLC entity 76. These two corresponding RLC entities 76 for the same RB 28, 48 are termed "RLC peer entities". The value of "n" for the n-bit sequence numbers 53 carried within the headers 51 of the RLC PDUs 50 will depend on the transport mode utilized between the RLC peer entities 76. For example, in AM transmissions, in which the RLC peer entities 76 acknowledge each RLC PDU 50 successfully received, n is 12. In other transport modes, n is 7. For communications between the UTRAN 20 and the UE 40 to be successful, it is essential that the RLC peer entities 76 be properly synchronized with each other. In particular, each RLC entity 76 contains two hyperframe numbers (HFNs): a receiving HFN (rHFN) 76r, and a transmitting HFN (tHFN) 76t. The tHFN 76t and rHFN 76r are used for encryption and decryption of packet data, respectively, as well as for integrity protection. For this encryption/decryption process to be successful, RLC peer entities 76 must have synchronized rHFN 76r and tHFN 76t values. In particular, the rHFN 76r of one RLC entity 76 must be identical to the tHFN of its RLC peer entity 76, and vice versa. As RLC PDUs 50 are transmitted by an RLC entity 76, the tHFN 76t steadily increases in value. As RLC PDUs 50 are received by an RLC entity 76, the rHFN 76r steadily increases in value. The rHFN 76r counts how many times rollover is detected in the sequence numbers 53 of received RLC PDUs 50. The tHFN 76t counts how many times rollover is detected in the sequence numbers 53 of transmitted RLC PDUs 50. The HFNs 76r, 76t may thus be thought of as non-transmitted high-order bits of the RLC PDU sequence numbers 53, and it is essential that these HFNs 76r, 76t are properly synchronized on the RLC peer entities 76. The bit size of the rHFN 76r and tHFN 76t values will depend upon the bit size of the RLC PDU 50 sequence number 53 bit size. In general, the HFNs 76r, 76t are combined with the sequence numbers 53 to form a so-called COUNT-C value that is 32 bits in size. This COUNT-C value is used by the RLC layer 72 to perform ciphering and deciphering of RLC PDUs 50, and the same COUNT-C valued used for the ciphering of an RLC PDU 50 must also be used for the deciphering of that RLC PDU 50. Another security function is performed, however, for SRBs, which is integrity protection. Integrity protection is performed in the RRC layer 80, and is applied only to SRBs (i.e., RB0 to RB4). Integrity protection also utilizes a count value, termed COUNT-I. COUNT-I is a 32-bit number generated from an HFN, maintained by the RRC layer 80, and a sequence number that is applied to each RRC message. In effect, the process is analogous to the ciphering operation that takes place in the RLC layer 72. The RRC 80 HFNs are 28 bits in size, and so the RRC sequence numbers are 4 bits in size.

The HFNs 76r, 76t are used as the high-order bits of the COUNT-C value, and the sequence number 53 of the PDU 50 is used as the low order bits. It is the UE 40, however, that is responsible for setting the initial values for the rHFN 76r and tHFN 76t, and this is done by way of a so-called START value. A START value is applied to an RLC entity 76, and is used to initialize the upper order bits (typically the 20 most significant bits) of the tHFN 76t and rHFN 76r. Furthermore, the same START values as applied to the RLC peer entities 76 are also used to set the HFNs in the RRC layer 80 for integrity protection. Hence, for the RB 28, 48 peer entities to initially be synchronized, it is important that the UE 40 and the UTRAN 20 apply the same START value to each RLC peer entity 76, and to the RRC peers 80.

A number of reconfiguration procedures are available to the RRC layer 80 to setup and configure RBs 28, 48. These procedures involve the UTRAN 20 sending a specific message to the UE 40 along an RB 28, 48, and the UE 40 responding in turn with a corresponding message. Typically, the message is sent along RB2, which is an SRB. The messages include Radio Bearer Setup, Radio Bearer Reconfiguration, Radio Bearer Release, Transport Channel Reconfiguration and Physical Channel Reconfiguration. For each of these reconfiguration messages, the UE 40 has a corresponding "Complete" or "Failure" response message that indicates success or failure of the procedure on the UE 40 side, and which may provide the UTRAN 20 any necessary information for the UTRAN 20 to complete the procedure. The reconfiguration message and the response message may all carry optional information elements (IEs), which are fields of data that hold ancillary information.

As the UE 40 moves closer towards the domain of the DRNS 20d, a decision is eventually made by the UTRAN 20 to place the UE 40 under the DRNS 20d, and a transfer process is enacted so that the DRNS 20d will become the new SRNS 20s of the UE 40. This process is termed an SRNS relocation procedure. The SRNS relocation procedure may be combined with any of the previously noted RRC procedures. In particular, by including a "Downlink counter synchronization info" IE in with a Radio Bearer Setup message, SRNS relocation will be triggered.

When receiving a reconfiguration message (which is sent from the SRNS 20s along RB2 28) that indicates that SRNS relocation is to be performed, the UE 40 re-establishes the RLC entity 76 of RB2 48, and re-initializes the rHFN 76r and the tHFN 76t for RB2 48. The RLC entity 76 for RB2 48 is re-established with an RLC peer entity 76 on the DRNS 20d, which will serve as the new SRNS 20s for the UE 40. The new values for the rHFN 76r and tHFN 76t for RB2 48 are given by the equation: MAX(rHFN of RB2, tHFN of RB2)+1, where MAX(a, b) selects the larger of a or b. The UE 40 then calculates a START value 49p, 49c for each CN 30 domain 30p, 30c and includes these START values 49p, 49c in a "START list" 49 IE within the response message. START values are used to initialize the rHFNs 76r and tHFNs 76t of all other RBs 48, 28 except RB0, as well as the HFNs for the RRC layer 80 for COUNT-I values. The START value 49p, 49c used to initialize the rHFN 76r, tHFN 76t of an RB 48, 28 depends upon the domain 30p, 30c with which the particular RB 48, 28 is associated. Currently, there are two domains: a packet switching (PS) domain 30p, and a circuit switching (CS) domain 30c. Hence, the START list 49 IE currently contains two values: the START value 49p for the PS domain 30p, and the START value 49c for the CS domain 30c. The UE 40 determines the START value for a domain 30p, 30c simply by looking at all RBs 48 within that domain 30p, 30c and adding two to the highest rHFN 76r or tHFN 76t found within the domain 30p, 30c, including the HFNs in the RRC layer 80 used for generating COUNT-I values. Consequently, rHFNs 76r and tHFNs 76t are values that are constantly increasing. After calculating the START list 49, the UE 40 then transmits the response message, which contains the START list 49 IE, to the UTRAN 20 along RB2 48. The RLC entity 76 of RB2 48 is an AM connection, and so the RRC layer 80 of the UE 40 is able to know if the UTRAN 20 has successfully received the response message, as the RLC entity 76 will so inform the RRC layer 80. After the RLC layer 76 of RB2 48 has confirmed the successful transmission of the response message, the RRC layer 80 of the UE 40 re-establishes the RLC entities 76 for all other RBs 48 (except RB0, which is a common channel), and re-initializes the rHFN 76r and tHFN 76t of these RBs 48 with the appropriate START value 49p, 49c that was included in the response message to the UTRAN 20, and likewise re-initializes the HFNs in the RRC layer 80. Using a similar procedure on the UTRAN 20 side, the UTRAN utilizes the START list 49 IE contained in the response message to initialize the HFNs 76r, 76t of all re-established RLC entities 76, and any corresponding HFNs in the RRC layer 80, and in this manner synchronization of the RLC peer entities 76 and RRC layers 80 is assured.

A new RB may be established by the UE 40, such as an RB 48n, by way of a Radio Bearer Setup procedure, which involves the RRC layer 80 of the UTRAN 20 sending a Radio Bearer Setup message to its peer entity on the UE 40. A corresponding new peer RB 28n is also created by this procedure on the UTRAN 20 side. As noted earlier, this Radio Bearer Setup procedure may be combined with the SRNS relocation procedure. Upon reception of a Radio Bearer Setup message, the UE 40 calculates a variable termed START_VALUE_TO_TRANSMIT 49s, which is to be used as the START value for the newly created RB 48n. This START_VALUE_TO_TRANSMIT value 49s is calculated in the manner indicated above for the START list 49 entries 49p, 49c. The UE 40 then composes a Radio Bearer Setup reply message. If no SRNS relocation is to be performed, this reply message will simply contain an IE termed "START", which contains the START_VALUE_TO_TRANSMIT value 49s. This provides the UTRAN 20 with the appropriate START value to be applied to the corresponding peer RB 28n. If, however, the Radio Bearer Setup message indicates that SRNS relocation is to be performed, then the UE 40 instead includes the START list IE 49 into the reconfiguration reply message. In this case, the UTRAN 20 will select one of the START values 49p, 49c from the START list IE 49 and apply this value to the corresponding peer 28n of the new RB 48n.

Before processing the SRNS procedure and related parameters, the UE 40 first processes the Radio Bearer Setup message. Hence, the START_VALUE_TO_TRANSMIT value 49s is generated first. If SRNS relocation is included with the Radio Bearer Setup procedure, the UE 40 will subsequently calculate the START list 49. However, this START list 49 calculation will include the START_VALUE_TO_TRANSMIT value 49s, and hence will generate an entry 49p, 49c that is at least two greater than the START_VALUE_TO_TRANSMIT value 49s. That is, when the UE 40 establishes the new radio bearer 48n, the HFN of COUNT-I for this RB is initialized with the variable START_VALUE_TO_TRANSMIT 49s. Subsequently, the START list 49 is generated, requiring the calculation of new START values, and this calculation will take into consideration the COUNT-I value of the newly created RB 48n. The Radio Bearer Setup reply message, which includes the START list 49, is sent by the UE 40 to the UTRAN 20. The UTRAN 20 will utilize one of the entries 49p, 49c in the START list 49 as the START value for the new RB 28n. The UE 40, however, continues to use the START_VALUE_TO_TRANSMIT value 49s. As a result, the tHFN 762 and rHFN 76r of the new RB 48n will be at least two less than the tHFN 762 and rHFN 76r of the new RB 28n. The RLC peer entities 76 of the new RBs 28n, 48n are thus not synchronized and will be unable to properly perform ciphering and deciphering operations. Integrity checking in the RRC layer 80 will likewise be adversely affected, as the COUNT-I values will not be synchronized.

SUMMARY OF INVENTION

It is therefore a primary objective of this invention to provide a method for synchronizing a START value for a Radio Bearer that is created by a Radio Bearer Setup procedure performed in conjunction with a SRNS relocation procedure.

Briefly summarized, the preferred embodiment of the present invention discloses a method for synchronizing a hyperframe number (HFN) between peer radio bearers (RBs) respectively supported by a user equipment (UE) and a Universal Terrestrial Radio Access Network (UTRAN). The peer RBs are created by a Radio Bearer Setup procedure performed in conjunction with a Serving Radio Network Subsystem (SRNS) relocation procedure. The UTRAN sends a Radio Bearer Setup message to the UE, which indicates that SRNS relocation is to be performed and that a new RB is to be established in a first domain. The UE receives the Radio Bearer Setup message and assigns a first START value to a START_VALUE_TO_TRANSMIT variable according to the HFNs of all established RBs in the first domain. The UE the generates a START list containing a plurality of entries corresponding to a plurality of domains, the plurality of domains including the first domain. The UE fills the entries with corresponding START values, synchronizing the entry corresponding to the first domain to hold a value that is identical to the value of the START_VALUE_TO_TRANMIT variable. The UE then composes a reply message that includes the START list, and sends the reply message to the UTRAN. Finally, the UE utilizes the START_VALUE_TO_TRANSMIT variable to set an HFN of the new RB. In second embodiment, the response message includes both the START list and the START_VALUE_TO_TRANMIT variable. The START list is applied to all RBs but the new RB. The START_VALUE_TO_TRANMIT variable is applied to the new RB.

It is an advantage of the present invention that by either forcing the appropriate entry in the START to be identical to the value held by the START_VALUE_TO_TRANMIT variable, or by explicitly including the value of the START_VALUE_TO_TRANMIT variable in the reply message, the present invention method ensures that both the UE and the UTRAN apply the same START value to the HFNs of new RB. Synchronization of the RLC peer entities for the new RB is thus assured, and hence proper cipher is performed. Similarly, synchronization of the START values ensures that integrity protection is properly performed in the RRC layer.

These and other objectives of the present invention will no doubt become obvious to those of ordinary skill in the art after reading the following detailed description of the preferred embodiment, which is illustrated in the various figures and drawings.

DETAILED DESCRIPTION

In the following description, user equipment (UE) is a wireless communications device, and may be a mobile telephone, a handheld transceiver, a personal data assistant (PDA), a computer, or any other device that requires a wireless exchange of data. It is assumed that this wireless exchange of data conforms to 3GPP-specified protocols. It should be understood that many means may be used for the physical layer to effect wireless transmissions, and that any such means may be used for the system hereinafter disclosed.

Figure 5:
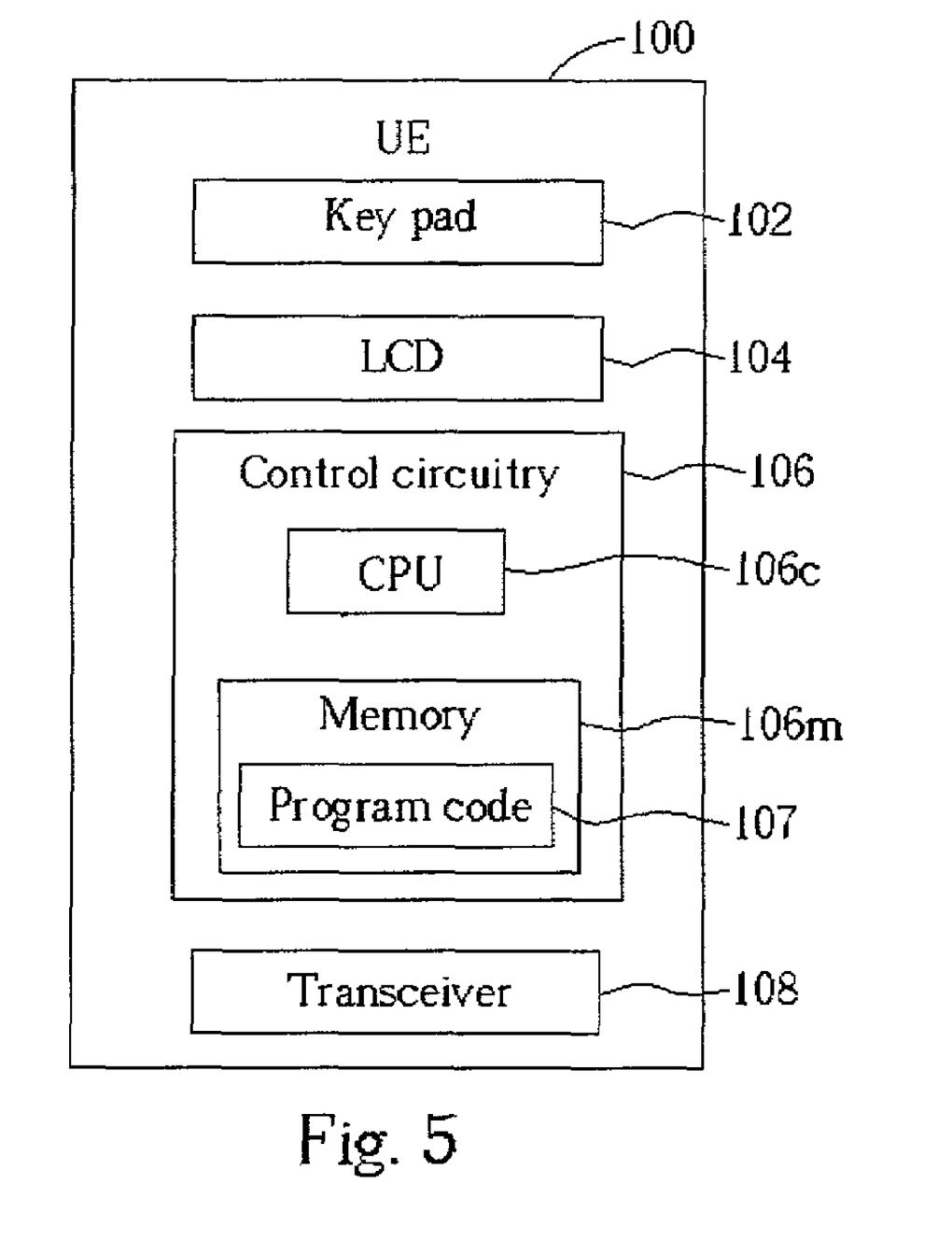
FIG. 5 is a block diagram of a wireless device according to the present invention.

Please refer to FIG. 5. FIG. 5 is a block diagram of a wireless device according to the present invention, hereinafter termed a UE 100. In most respects, the present invention UE 100 is identical to the UE 40 of the prior art. As such, FIG. 2 to FIG. 4, which illustrate general aspects of the 3GPP communications protocol, are also suitable for providing illustration of the present invention method. The UE 100 includes devices for accepting input and providing output, such as a keypad 102 and a liquid crystal display (LCD) 104, respectively. A transceiver 108 is capable of receiving wireless signals and providing corresponding data to a control circuit 106, and can also wirelessly transmit data received from the control circuit 106. The transceiver 108 is thus part of the layer 1 stack 60 of the present invention communications protocol. The control circuitry 106 is responsible for controlling the operations of the UE 100, and is used to implement the layer 2 and layer 3 stacks of the communications protocol. To this end, the control circuitry 106 includes a central processing unit (CPU) 106c in electrical communication with memory 106m, an arrangement familiar to those in the art of wireless communication devices. The memory 106m holds program code 107 that is used to implement the layer 2 and layer 3 stacks of the present invention communications protocol. With respect to the UE 40 of the prior art, the present invention UE 100 has modifications to the program code 107 to implement the present invention method. These modifications should be well within the means of one reasonably skilled in the art after reading the following detailed description of the preferred embodiment.

Figure 6:
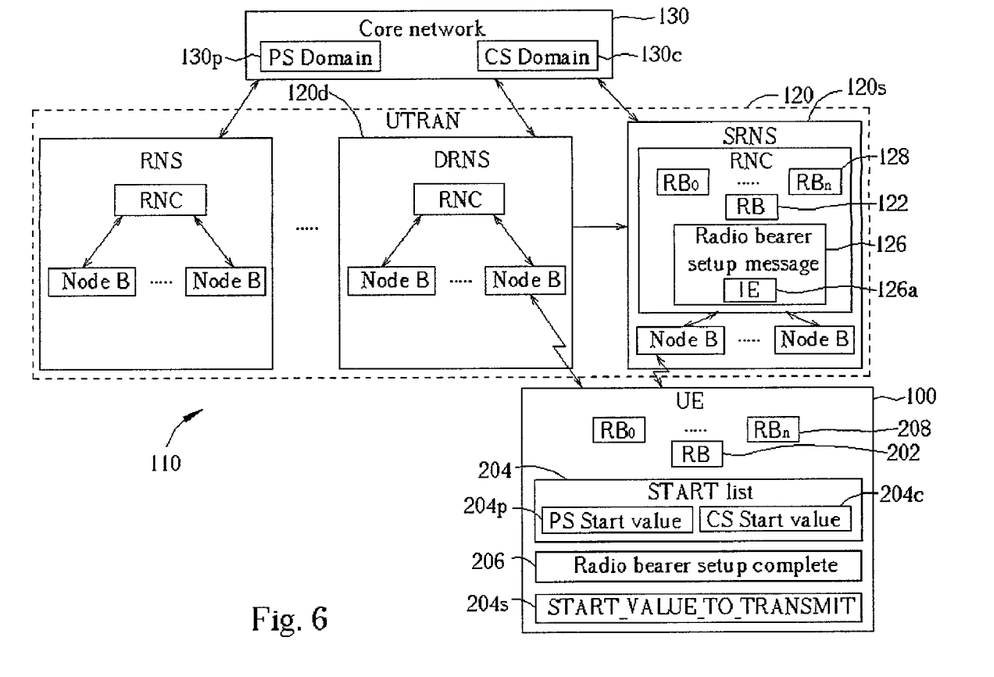
FIG. 6 is a simple block diagram of a present invention first embodiment UE within a wireless communications system.
Figure 7:
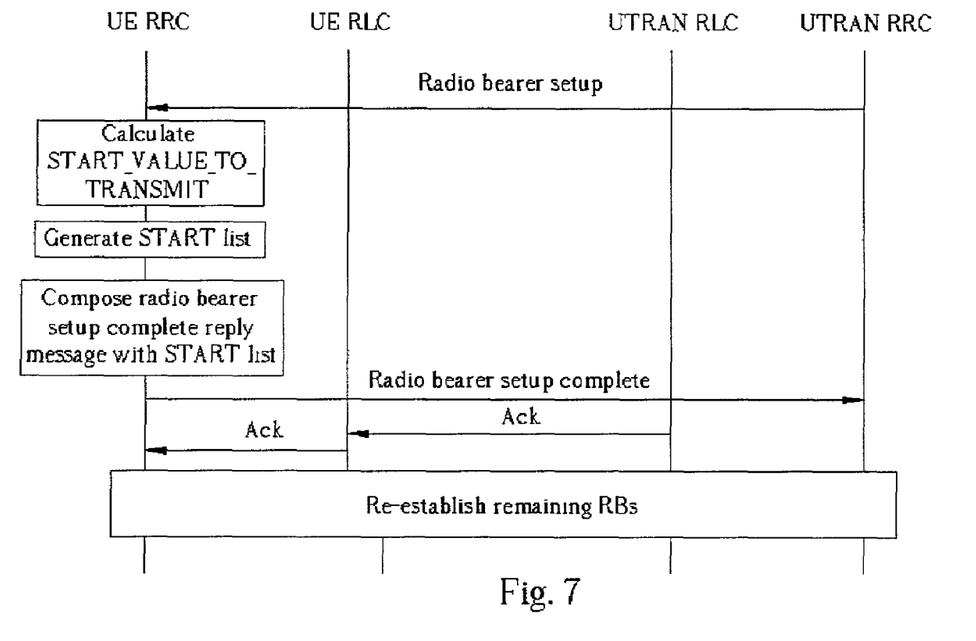
FIG. 7 is a message sequence chart for a first embodiment of the present invention method.

Please refer to FIG. 6 with reference to FIG. 2 to FIG. 5. FIG. 6 is a simple block diagram of the UE 100 within a wireless communications system 110. The wireless communications system 110 includes a UTRAN 120 in communications with a core network 130. The UTRAN 120 and the core network 130 are nearly identical to those of the prior art. Initially, the UE 100 is in communications with a SRNS 120s via a plurality of radio bearers 208, RB0 thru RBn (as supported by the program code 107). As the UE 40 moves closer towards the domain of a DRNS 120d, a decision is eventually made by the UTRAN 120 to place the UE 100 under the DRNS 120d, and an SRNS relocation procedure is started. Simultaneously, though, new RB peers 122, 202 are to be established. This establishment is performed by way of a Radio Bearer Setup message 126 that is sent by the UTRAN 120 to the UE 100, typically by way of RB2. The Radio Bearer Setup message 126 includes an IE 126a that indicates that SRNS relocation is to be performed. The IE 126a is a "Downlink counter synchronization info" IE. Please refer to FIG. 7 with reference to FIGS. 2 to 6. FIG. 7 is a message sequence chart for the first embodiment of the present invention method. The RRC layer 80 of the UTRAN 120 sends the Radio Bearer Setup message 126 to the RRC layer 80 of the UE 100. The Radio Bearer Setup message 126 also indicates the domain 130p, 130c of the new peer RBs 122, 202. The UE 100 receives the Radio Bearer Setup message 126 and generates a START value for a START_VALUE_TO_TRANSMIT variable 204s. This START value 204s should be greater than that corresponding to any of the HFNs 76r, 76t within the domain 130p, 130c of the new RB 202, the domain 130p, 130c indicated by the Radio Bearer Setup message 126. This calculation for the START_VALUE_TO_TRANSMIT variable 204s is analogous to the prior art method. The UE 100 then generates a START list 204, having START value entries 204p and 204c for the PS domain 130p and the CS domain 130c, respectively. If the new RB 202 is in the PS domain 130p, then the PS START value entry 204p is filled with the value held by the START_VALUE_TO_TRANSMIT variable 204s. The CS START value entry 204c is calculated in the normal manner, by considering all RBs 208 in the CS domain 130c, and setting the CS START value 204c to be two greater than that of the greatest HFN 76r, 76t in the CS domain 130c. If the new RB 202 is in the CS domain 130p, then the CS START value entry 204c is filled with the value held by the START_VALUE_TO_TRANSMIT variable 204s. The PS START value entry 204p is then calculated in the normal manner, by considering all RBs 208 in the PS domain 130p, and setting the PS START value 204p to be two greater than that of the greatest HFN 76r, 76t in the PS domain 130p. Of course, this procedure could be generalized to any number of domains in the CN 130. In short, the entry in the START list 204 that corresponds to the domain 130p, 130c of the new RB 202 is filled with the value held by the START_VALUE_TO_TRANSMIT variable 204s, and all other entries are calculated normally. Alternatively, all entries 204p, 204c in the START list 204 could be generated as in the prior art, but then the entry 204p, 204c corresponding to the domain 130p, 130c of the new RB 202 is used to set the value of the START_VALUE_TO_TRANSMIT variable 204s. In either case, the entry 204p, 204c held in the START list 204 that corresponds to the domain 130p, 130c of the new RB 202 will be synchronized with the value held in the START_VALUE_TO_TRANSMIT variable 204s. The UE 100 then composes a Radio Bearer Setup Complete message 206, which includes the START list 204, and transmits the Radio Bearer Setup Complete message 206 (which is a reply message to the original reconfiguration message 126) to the UTRAN 120. Because an AM connection is used to transmit the Radio Bearer Setup Complete message 206, the RLC layer 76 of the UTRAN 120 will acknowledge successful receipt of the Radio Bearer Setup Complete message 206. In turn, the RLC layer 76 of the UE 100 will inform the RRC layer 80 that the UTRAN successfully received the Radio Bearer Setup Complete message 206 (indicated by the "Ack" in FIG. 7). In response to this acknowledgement, the RRC layer 80 of the UE 100 re-establishes all remaining RBs 208 (except RB2, RB0, and the new RB 202), utilizes the START list 204 to set the HFNs 76r, 76t of the re-established RBs 208, and utilizes the START_VALUE_TO_TRANSMIT variable to set the HFNs 76r, 76t of the new RB 202. However, as this value is identical to the corresponding value in the START list 204, synchronization between the peer entity RBs 122, 202 is assured. This is because the UTRAN 120 utilizes the START list 204, as received in the Radio Bearer Setup Complete message 206, to assign the HFNs 76r, 76t to the re-established RBs 128, as well as to the new RB 122. Note that, with regards to the newly established RB 48n, the UE 40 initializes the HFNs 76r, 76t for COUNT-C (and the corresponding HFNs for COUNT-I, if the new RB 48n is an SRB) for the new RB48 upon reception of the Radio Bearermessage 126, instead of upon reception of the acknowledgment.

Figure 8:
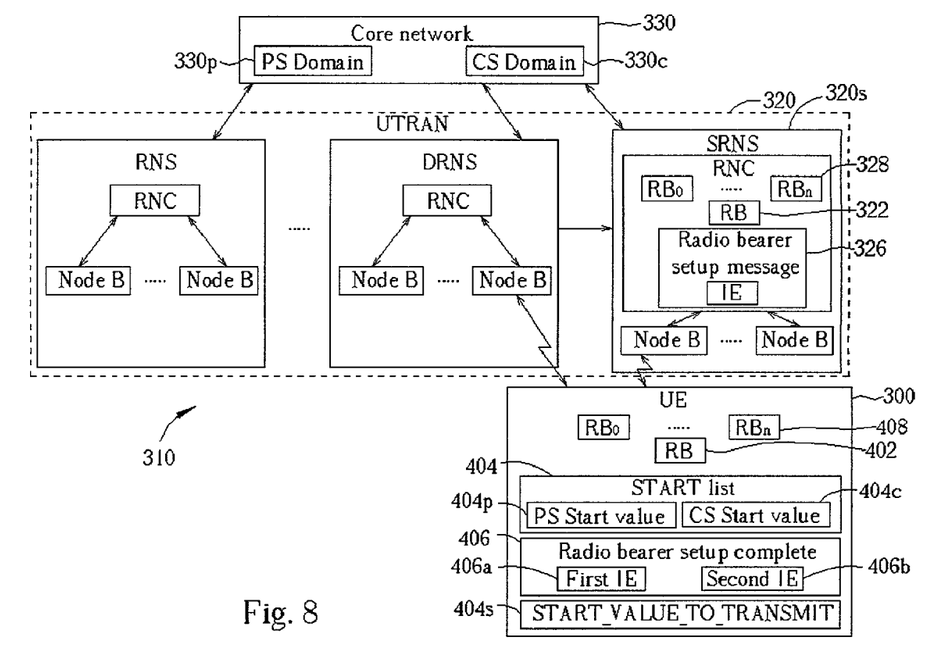
FIG. 8 is a simple block diagram of a present invention second embodiment UE within a wireless communications system.
Figure 9:
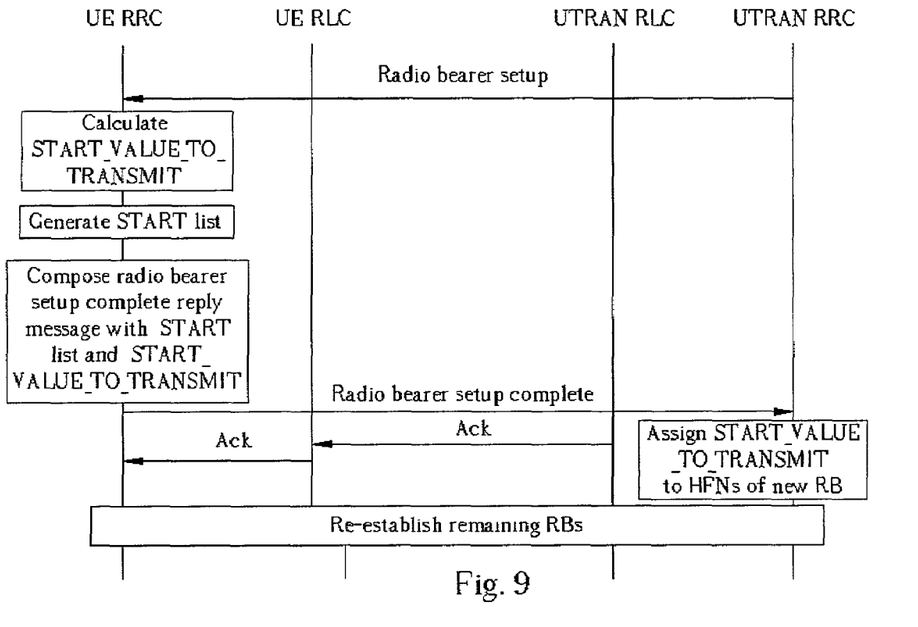
FIG. 9 is a message sequence chart for a second embodiment of the present invention method.

Please refer to FIG. 8 and FIG. 9 with reference to FIGS. 2 to 5. FIG. 8 is a simple block diagram of a second embodiment UE 300 within a wireless communications system 310. FIG. 9 is a message sequence chart for a second embodiment of the present invention method. The UE 300 is nearly identical to the UE 100, but for appropriate changes in the program code 107 to support the second embodiment method. In the second embodiment, the UE 300 receives a Radio Bearer Setup message 326 as sent by the UTRAN 320. The Radio Bearer Setup message 326 is identical to the Radio Bearer Setup message 126 of FIG. 6. The UE 300 generates a START value for a START_VALUE_TO_TRANSMIT variable 404s, and generates a START list 404, as in the prior art, or as indicated in the first embodiment method. Consequently, the START_VALUE_TO_TRANSMIT variable 404s does not necessarily contain a START value that is present in one of the entries 404p, 404c within the START list 404. However, when the UE 300 composes the Radio Bearer Setup Complete message 406, the UE 300 includes a first IE 406a and a second IE 406b in the Radio Bearer Setup Complete message 406. The first IE 406a is a so-called "START List" IE, and holds the START list 404. The second IE 406b is a so-called "START" IE, and holds the START value contained within the START_VALUE_TO_TRANSMIT variable 404s. This second IE 406b is included regardless of the fact that SRNS relocation is being performed. The UE 300 utilizes the START value held within the START_VALUE_TO_TRANSMIT variable 404s to set the HFNs 76r, 76t of the new RB 402 that is being established by the Radio Bearer Setup message 326. The UE 300 then transmits the Radio Bearer Setup Complete message 406 to the UTRAN 320. Upon receiving the Radio Bearer Setup Complete message 406, the UTRAN 320 utilizes the second IE 406b to set the HFNs 76r, 76t of the new RB 322 that is being established by the Radio Bearer Setup message 326. The UTRAN 320 utilizes the first IE to set the HFNs 76r, 76t of all remaining RBs 408 (except RB0 and RB2). Similarly, the UE 300 utilizes the START list 404 to set the HFNs 76r, 76t of all remaining RBs 408 once they have been re-established in response from acknowledgement that the UTRAN 320 successfully received the Radio Bearer Setup Complete message 406. As both the UE 300 and the UTRAN 320 are utilizing the same START value to set the HFNs 76r, 76t of the new RB 402, 322, (i.e., the value held by the second IE 406b) synchronization of the new RB peer entities 402, 322 is assured.

In contrast to the prior art, the present invention provides for an extra IE within a reply message sent in response to a Radio Bearer Setup message that includes SRNS relocation. This extra IE permits the UE and the UTRAN to properly synchronize the HFNs of the new RB that is established by the Radio Bearer Setup message. Alternatively, the present invention forces one of the entries in the START List IE within the reply message to be identical to a variable maintained within the UE that is used to set the HFNs of the new RB. In either case, proper synchronization of the HFNs for a new RB established during SRNS relocation is assured.

What is claimed is:

1. A method for synchronizing a hyperframe number (HFN) between peer radio bearers (RBs) respectively supported by a user equipment (UE) and a Universal Terrestrial Radio Access Network (UTRAN), the peer RBs created by a Radio Bearer Setup procedure performed in conjunction with a Serving Radio Network Subsystem (SRNS) relocation procedure, the method comprising:

sending a Radio Bearer Setup message from the UTRAN to the UE, the Radio Bearer Setup message indicating that SRNS relocation is to be performed and that a new RB is to be established in a first domain;

in response to the Radio Bearer Setup message, the UE assigning a first START value to a START_VALUE_TO_TRANSMIT variable according to the HFNs of all established RBs in the first domain;

the UE utilizing the START_VALUE_TO_TRANSMIT variable to set an HFN of the new RB;

in response to the Radio Bearer Setup message, the UE generating a START list containing a plurality of entries corresponding to a plurality of domains, the plurality of domains including the first domain;

the UE filling the entries with corresponding START values, wherein the UE synchronizes the entry corresponding to the first domain to hold a value that is identical to the value of the START_VALUE_TO_TRANSMIT variable;

in response to the Radio Bearer Setup message, the UE composing a reply message, the reply message including the START list; and the UE sending the reply message to the UTRAN.

2. The method of claim 1 where the UE assigns the first START value to the entry corresponding to the first domain in the START list.

3. The method of claim 1 where the UE assigns the START value of the entry in the START list corresponding to the first domain to the START_VALUE_TO_TRANSMIT variable.

4. A wireless device comprising a central processing unit (CPU) in electrical communications with a memory, the memory encoded with program code for implementing the method of claim 1.

5. A method for synchronizing a hyperframe number (HFN) between peer radio bearers (RBs) respectively supported by a user equipment (UE) and a Universal Terrestrial Radio Access Network (UTRAN), the peer RBs created by a Radio Bearer Setup procedure performed in conjunction with a Serving Radio Network Subsystem (SRNS) relocation procedure, the method comprising:

sending a Radio Bearer Setup message from the UTRAN to the UE, the Radio Bearer Setup message indicating that SRNS relocation is to be performed and that a new RB is to be established in a first domain;

in response to the Radio Bearer Setup message, the UE assigning a first START value to a START_VALUE_TO_TRANSMIT variable according to the HFNs of all established RBs in the first domain;

the UE utilizing the START_VALUE_TO_TRANSMIT variable to set an HFN of the new RB;

in response to the Radio Bearer Setup message, the UE generating a START list containing a plurality of START values corresponding to a plurality of domains, the plurality of domains including the first domain;

in response to the Radio Bearer Setup message, the UE composing a reply message, the reply message including the START list as a first information element (IE) and including the first START value of the START_VALUE_TO_TRANSMIT variable as a second IE;

the UE sending the reply message to the UTRAN; and the UTRAN utilizing the second IE to set a corresponding HFN for the new RB.

6. A wireless device comprising a central processing unit (CPU) in electrical communications with a memory, the memory encoded with program code for implementing the method of claim 5.

* * * * *